(12) United States Patent
Laukhuf

(10) Patent No.: US 10,447,020 B2
(45) Date of Patent: Oct. 15, 2019

(54) SEAL FOR ELECTRICAL BOX

(71) Applicant: ALLIED MOULDED PRODUCTS, INC., Bryan, OH (US)

(72) Inventor: Gregg E. Laukhuf, Bryan, OH (US)

(73) Assignee: ALLIED MOULDED PRODUCTS, INC., Bryan, OH (US)

( * ) Notice: Subject to any disclaimer, the term of this patent is extended or adjusted under 35 U.S.C. 154(b) by 0 days.

(21) Appl. No.: 16/211,969

(22) Filed: Dec. 6, 2018

(65) Prior Publication Data

US 2019/0109446 A1    Apr. 11, 2019

Related U.S. Application Data

(63) Continuation of application No. 15/795,435, filed on Oct. 27, 2017, now Pat. No. 10,186,852.

(60) Provisional application No. 62/414,141, filed on Oct. 28, 2016.

(51) Int. Cl.
    *H02G 3/12* (2006.01)
(52) U.S. Cl.
    CPC ............. *H02G 3/126* (2013.01); *H02G 3/123* (2013.01)
(58) Field of Classification Search
    CPC ..................................................... H02G 3/126
    See application file for complete search history.

(56) References Cited

U.S. PATENT DOCUMENTS

| | | | |
|---|---|---|---|
| 4,794,207 A | 12/1988 | Norberg et al. | |
| 4,952,754 A * | 8/1990 | Rye | H02G 3/088 174/53 |
| 6,239,365 B1 | 5/2001 | McEvers | |
| 6,908,003 B2 | 6/2005 | Feyes et al. | |
| RE41,661 E * | 9/2010 | Dinh | H02G 3/088 174/480 |
| 7,851,703 B2 * | 12/2010 | Drane | H05K 5/061 174/50 |
| 9,018,524 B2 | 4/2015 | Dinh | |
| 2005/0178079 A1 * | 8/2005 | Hardman | E06B 1/02 52/208 |

* cited by examiner

*Primary Examiner* — William H. Mayo, III
*Assistant Examiner* — Hiram E Gonzalez
(74) *Attorney, Agent, or Firm* — Shumaker, Loop & Kendrick, LLP; James D. Miller

(57) ABSTRACT

An electrical box includes a front surface having an opening providing access to a hollow interior of the electrical box, at least one sidewall extending rearwardly from the front surface to form the hollow interior, and a seal disposed on an exterior surface of the at least one sidewall. The seal has a triangular cross-sectional shape including a thin end configured to first enter an opening of a building structure receiving the electrical box therein. A tapered surface of the seal is compressed as the electrical box is received into the opening in the building structure to provide a seal around an exterior surface of the at least one sidewall of the electrical box.

13 Claims, 4 Drawing Sheets

SEAL FOR ELECTRICAL BOX

CROSS-REFERENCE TO RELATED APPLICATION

This patent application is a continuation patent application of U.S. patent application Ser. No. 15/795,435 filed Oct. 27, 2017, which claims priority to U.S. Provisional Patent Application Ser. No. 62/414,141 filed on Oct. 28, 2016, the entire disclosures of which are hereby incorporated herein by reference.

FIELD OF THE INVENTION

The present invention relates to electrical boxes and flush mounted device boxes such as currently used for mounting electrical devices in walls, floors, and ceilings, and more particularly to an electrical outlet box and flush mounted device box that maintains a vapor barrier about a perimeter thereof.

BACKGROUND OF THE INVENTION

Electrical boxes are used in building construction for enclosing electrical components such as switches, outlets, and electrical appliance connections. The electrical box is generally secured to studs or joists in a wall, ceiling, or floor construction with an open front or face of the electrical box facing toward an interior of a room. When an electrical box is utilized, a vapor barrier provided by the wall to prevent cold winter air from entering into a structure or building through the wall must be at least partially penetrated by the mounting of the box. Therefore, it is highly desirable to provide a new and improved electrical box, which allows the box to be installed in a wall, while maintaining an integrity of the vapor barrier of the wall.

One method of providing a vapor barrier in external walls and ceilings of a building is to provide a vapor seal comprising a continuous plastic sheet between the studs and the drywall of the building. The vapor seal forms an entirely encompassing vapor barrier around an exterior wall of the building to prevent undesired leakage of air into or out of the building. The use of the electrical box requires penetration of the vapor seal, as well as the layers of drywall provided adjacent the vapor seal. Heretofore, it is extremely difficult to provide a vapor seal between the electrical box and the drywall to maintain the integrity of the vapor barrier. Therefore, it is highly desirable to provide a new and improved electrical box that can provide the vapor seal at the vapor barrier of the exterior wall or the ceiling to maintain the integrity of the vapor barrier.

In many circumstances, the electrical box is installed into an existing wall structure wherein components such as the joists, the studs, the vapor seal, and the layers of drywall are already installed. Electrical boxes used for such applications are typically referred to as "old work" electrical boxes. The introduction of the new electrical box typically requires portions of the wall or ceiling construction, including the drywall and potentially a portion of the vapor seal, to be penetrated and subsequently removed to form an opening having a shape and size corresponding to a shape and size of a periphery of the electrical box. One or more gaps may be created about the periphery of the electrical box if such an opening does not correspond precisely to the shape and size of the periphery of the electrical box. Thus, air may flow between a space in the wall or the ceiling present outboard of the vapor barrier and an interior of the room requiring the opening, thereby reducing a thermal efficiency of the wall or the ceiling.

It is desirable to provide a new and improved electrical box that not only can be mounted in a manner to maintain the integrity of a vapor barrier in an exterior wall or ceiling of a building, but which also accommodates any small inconsistencies in dimensions, alignment, and the like of the electrical box within the wall structure, allowing fast and efficient construction, while at the same time maintaining a vapor seal about a periphery of the electrical box.

SUMMARY OF THE INVENTION

In concordance and agreement with the present invention, an electrical box providing a seal about a perimeter of an exterior surface thereof has surprisingly been discovered.

In one embodiment, an electrical box comprises a front surface having an opening formed therein providing access to a hollow interior of the electrical box, at least one sidewall extending rearwardly from the front surface to form the hollow interior, and a seal disposed on an exterior surface of the at least one sidewall.

BRIEF DESCRIPTION OF THE DRAWINGS

The above objects and advantages of the invention, as well as others, will become readily apparent to those skilled in the art from reading the following detailed description of a preferred embodiment of the invention when considered in the light of the accompanying drawings, in which.

DETAILED DESCRIPTION

The following detailed description and appended drawings describe and illustrate various exemplary embodiments of the invention. The description and drawings serve to enable one skilled in the art to make and use the invention, and are not intended to limit the scope of the invention in any manner.

Figure 1:
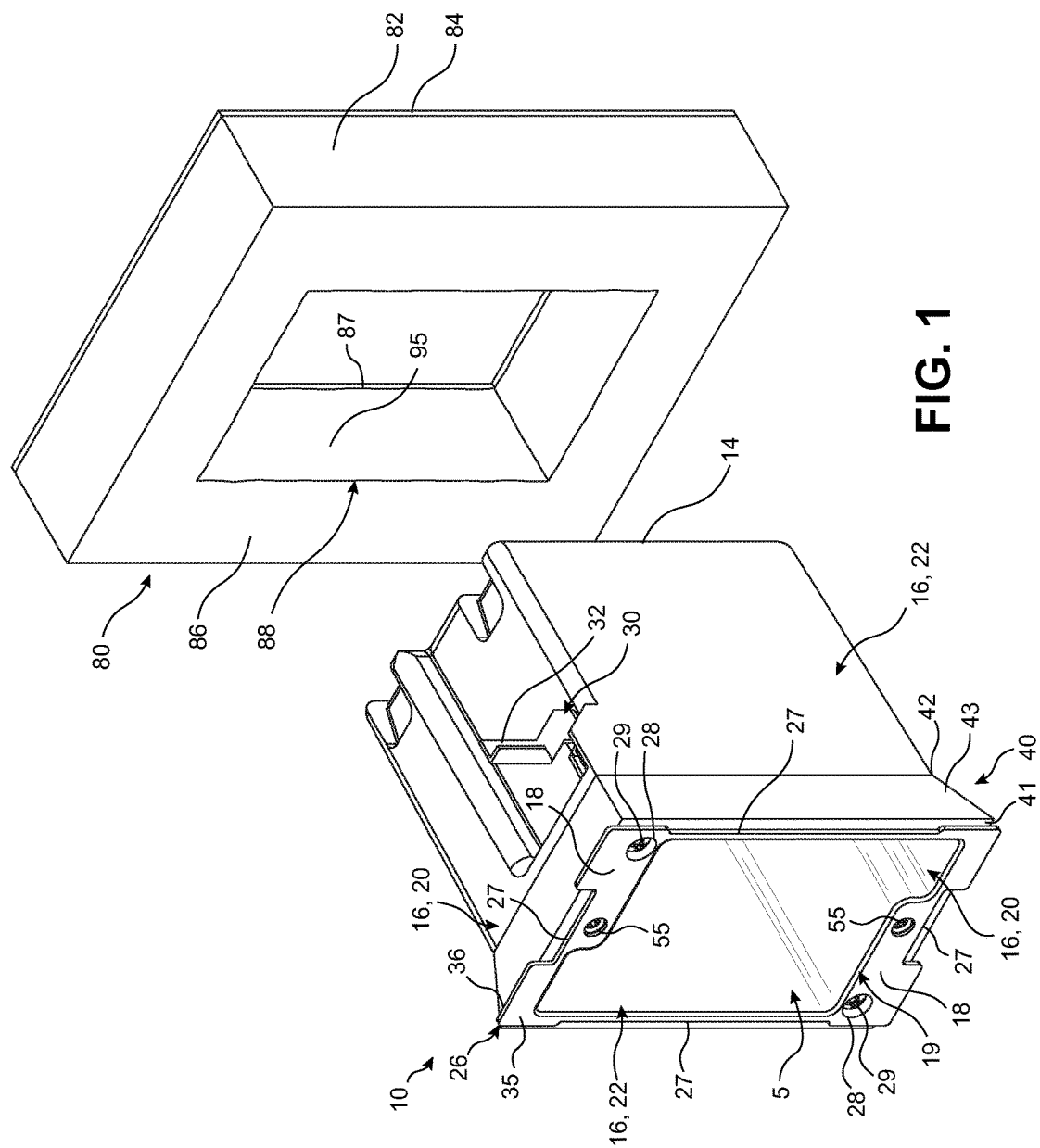
FIG. 1 is an exploded perspective view of an electrical box and a portion of a building structure having a peripheral seal, the electrical box shown prior to installation of the electrical box into an opening formed in the building structure according to an embodiment of the invention.
Figure 2:
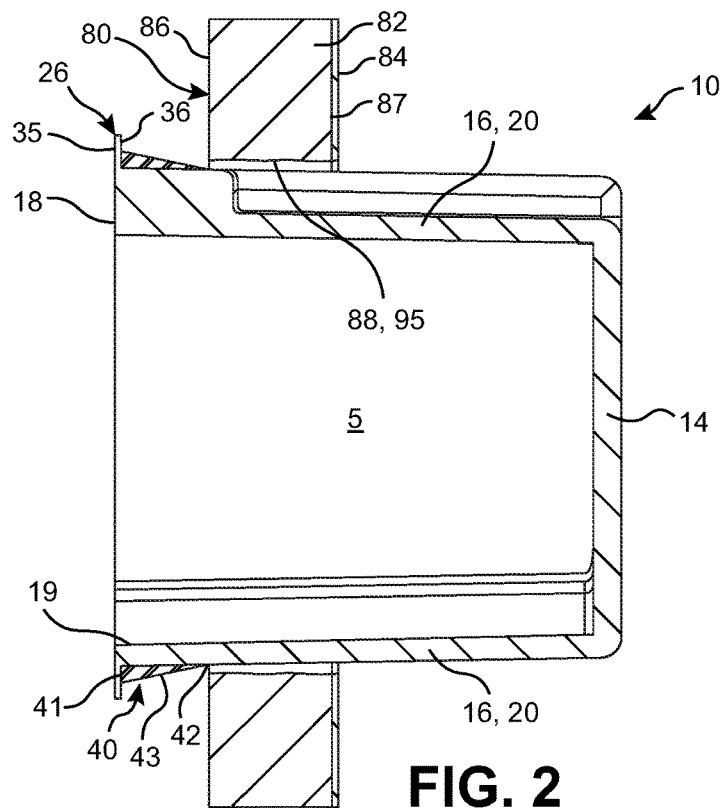
FIG. 2 is a cross-sectional elevational view of the electrical box of FIG. 1 prior to installation into the opening of the building structure.
Figure 3:
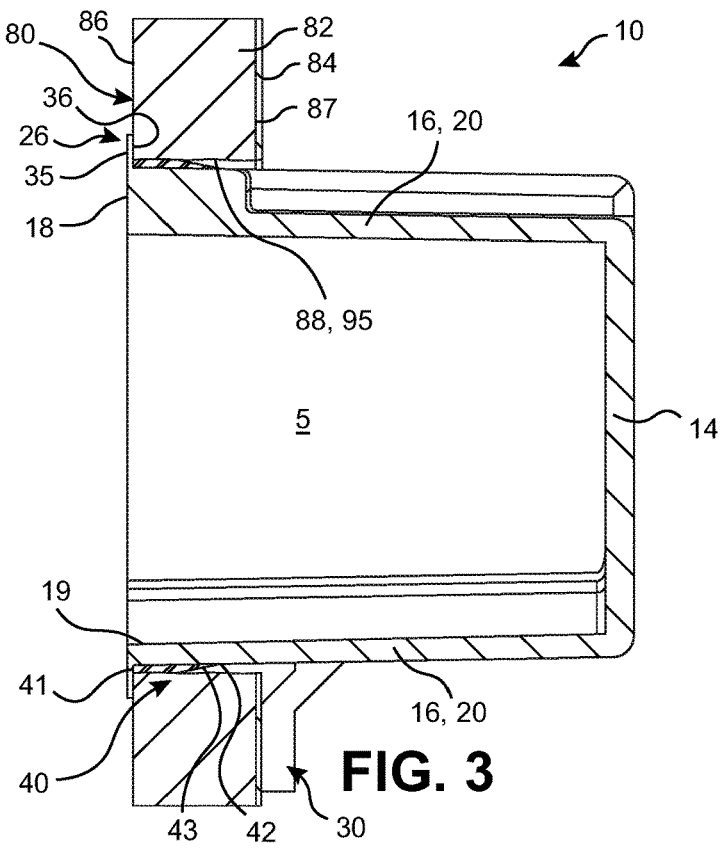
FIG. 3 is a cross-sectional elevational view of the electrical box of FIG. 1 shown installed in the opening of the building structure.

FIGS. 1-3 illustrate an electrical box 10 according to an embodiment of the invention. The electrical box 10 may be configured as an "old work" electrical box, meaning that the electrical box 10 may be suitable for installation into a finished wall or ceiling structure having a layer of drywall already installed. The electrical box 10 may be adapted for any use consistent with the housing of electrical components therein. The electrical box 10 may be an outlet box or a flush mounted device box, for example. The electrical box 10 may be provided in several different materials. These include, but are not limited to, steel, other metals, various moldable thermoplastics such as PVC, polycarbonate, polyphenylene oxide, and fiberglass reinforced polyester. A single gang rectangular box is shown in FIGS. 1-3. However, such boxes are also provided in a two gang box, a three gang box, and a four gang box with and without optional mounting brackets, as desired.

As shown in FIG. 1, the electrical box 10 is configured for installation in a building structure 80 including at least one layer of drywall 82 and an optional vapor seal 84 disposed adjacent the at least one layer of drywall 82. The building structure 80 is described and illustrated throughout as including a single layer of the drywall 82 having a standard thickness. However, it is understood that the electrical box 10 may be adapted for use with drywall of any thickness or any number of layers of the drywall without departing from the scope of the present invention. It is also understood that the electrical box 10 may be used in conjunction with any type of building material suitable for forming an opening for housing the electrical box 10, including wood constructions, metal constructions, composite constructions, combinations thereof, and the like.

The vapor seal 84 may be formed from a layer of plastic or similar material disposed adjacent and oriented substantially parallel with the layer of the drywall 82 to provide a sealing structure for preventing the flow of air therethrough. The building structure 80 may further include a plurality of studs (not shown) or joists (not shown) spaced apart from each other and in abutment with one of the vapor seal 84 or the layer of drywall 82.

The building structure 80 may include an opening 88 formed therein for receiving the electrical box 10. The opening 88 extends through the layer of drywall 82 as well as the optional vapor seal 84 to allow the electrical box 10 to penetrate the building structure 80. The electrical box 10 is thus received at least partially within a hollow interior of the building structure 80 formed intermediate the layer of drywall 82 and/or vapor seal 84 and an exterior surface (not shown) of the building having the building structure 80.

The electrical box 10 includes a plurality of sidewalls 16 forming a closed perimeter of the electrical box 10. The electrical box 10 illustrated in FIGS. 1-3 has a rectangular perimeter shape including a pair of opposing short sides 20 and a pair of opposing long sides 22. An inner or rear wall 14 of the electrical box 10 is formed at one end of the sidewalls 16 and is configured to be disposed beyond an inner surface of the building structure 80 when the electrical box 10 is installed into the opening 88. The inner wall 14 of the electrical box 10 may be substantially closed off with the exception of various openings (not shown) or knockouts (not shown) for receiving electrical components to be received within the electrical box 10. In some embodiments, the openings or knockouts may be formed in one of the sidewalls 16 of the electrical box 10, as desired. In other embodiments, the opening or knockouts may form a portion of a structure for coupling the electrical box to a portion of the building structure 80 such as a joist or stud thereof.

A front surface 18 of the electrical box 10 is disposed opposite the inner wall 14 thereof. The front surface 18 of the electrical box 10 is substantially planar and includes a central opening 19 providing access to a hollow interior 5 of the electrical box 10 delimited by each of the sidewalls 16 and the inner wall 14 thereof. The central opening 19 is substantially rectangular in shape and generally corresponds to the rectangular shape formed by the cooperating structure of the sidewalls 16.

In the embodiment shown, the front surface 18 of the electrical box 10 further includes a plurality of retention flanges 26. The retention flanges 26 are disposed at each of the corners of the front surface 18 as shown, but any arrangement of the retention flanges 26 may be used without departing from the scope of the present invention. It is understood the retention flanges 26 may be unitary to form a substantially contiguous retention flange around the perimeter of the central opening 19. Each of the retention flanges 26 forms a projecting portion of the front surface 18 of the electrical box 10 extending outwardly beyond one or more of the sidewalls 16 thereof. Each of the retention flanges 26 includes a front surface 35 formed co-planar with the remainder of the front surface 18 of the electrical box 10 and a rear surface 36 spaced from the front surface 18 by a thickness dimension of each of the retention flanges 26. The rear surface 36 of each of the retention flanges 26 is configured to abut an outer surface 86 of the layer of drywall 82 when the electrical box 10 is fully received in the opening 88 formed through the building structure 80. The retention flanges 26 space the remainder of the front surface 18 of the electrical box 10 from the outer surface 86 of the layer of drywall 82 by a distance equal to the thickness dimension of each of the retention flanges 26. The retention flanges 26 provide a stopping mechanism for establishing an axial position of the electrical box 10 within the opening 88 formed in the building structure 80.

The electrical box 10 further includes a peripheral edge 27 formed at those portions of the front surface 18 of the electrical box 10 intersecting the sidewalls 16 thereof intermediate adjacent ones of the retention flanges 26. Each portion of the peripheral edge 27 is accordingly disposed co-planar with the remainder of the front surface 18 of the electrical box 10 while also spaced in an axial direction of the electrical box 10 from the rear surface 36 of each of the retention flanges 26 by the thickness dimension of each of the retention flanges 26.

The peripheral edge 27 of the electrical box 10 preferably corresponds to the shape of the opening 88 of the building structure 80 at the outer surface 86 of the layer of drywall 82. However, as explained hereinafter, it is not unusual for the opening 88 to be formed slightly larger than the exterior surface of the electrical box 10 while having inconsistent edges or dimensions following formation of the opening 88. In some instances, these inconsistent edges are formed as a result of cracking or chipping of a portion of the layer of drywall 82 during the formation of the opening 88. Alternatively, the opening 88 may have an inconsistent shape due to user error during formation of the opening 88 or tools used to form the opening 88. The opening 88 may also be intentionally oversized to ensure entry of the electrical box 10 during installation of the electrical box 10 in the opening 88.

The front surface 18 of the electrical box 10 is illustrated as having a pair of clamping apertures 28. The clamping apertures 28 are shown as formed adjacent corners of the front surface 18, but any suitable position for the clamping apertures 28 may be used without departing from the scope of the present invention. Each of the clamping apertures 28 is configured to receive a clamping screw 29 forming a portion of a swing clamp 30 for clamping the electrical box 10 to the building structure 80.

The swing clamp 30 includes a clamping arm 32 configured to be drawn towards an end of the clamping screw 29 disposed at the front surface 18 of the electrical box 10 when the clamping screw 29 is rotated within the associated clamping aperture 28. The clamping arm 32 is also rotatable to a position wherein the clamping arm 32 does not extend beyond the peripheral edge 27 of the front surface 18 to allow the electrical box 10 to be received within the opening 88 formed in the layer of drywall 82 without providing interference thereto. The clamping arm 32 is then rotatable to be positioned in facing relationship with an inner surface 87 of the layer of drywall 82 disposed outboard of the opening 88 or the optional layer of the vapor seal 84 following the insertion of the electrical box 10 within the opening 88. Rotation of the clamping screw 29 within the clamping aperture 28 draws the clamping arm 32 towards the front surface 18 of the electrical box 10. The layer of drywall 82 and the optional layer of the vapor seal 84 are eventually sandwiched between the rear surface 36 of each of the retention flanges 26 and the clamping arm 32 of each of the swing clamps 30. The swing clamp 30 accordingly aids in securing an axial position of the electrical box 10 in the opening 88 of the building structure 80.

Although the electrical box 10 has been described as including a swing clamp 30 for coupling the electrical box 10 to the building structure 80, it should be understood that the electrical box 10 may be adapted for use with any suitable coupling method for retaining an electrical box within an opening formed as part of an old work electrical box installation. In some circumstances, the electrical box 10 may be coupled directly to the joists or studs abutting the vapor seal 84 or the layer of drywall 82. Accordingly, side entry fastening means and the like may be employed for such circumstances, as desired.

The electrical box 10 may further include a plurality of bosses 55 formed in the front surface 18 thereof. Each of the bosses 55 may form a connection for an electrical device (not shown) to be disposed within the electrical box 10. However, alternative methods of connecting an associated electrical device within the electrical box 10 may be used without departing from the scope of the present invention.

The electrical box 10 includes a peripheral seal 40 disposed on an exterior surface of each of the sidewalls 16 of the electrical box 10 at a position adjacent the front surface 18 thereof. The peripheral seal 40 includes a substantially triangular cross-sectional shape including a thick end 41 disposed in alignment with the rear surface 36 of each of the retention flanges 26 and spaced from the peripheral edge 27 of the front surface 18 by the thickness dimension of each of the retention flanges 26. The peripheral seal 40 further includes a thin end 42 spaced from the thick end 41 in the axial direction of the electrical box 10. As used hereinafter, the phrase "thick end" refers to the end of the peripheral seal 40 having a thickness in a radially outward direction of the electrical box 10 in comparison to the thin end 42 of the electrical box 10, which is substantially pointed and therefore has substantially no thickness or a very slight thickness. The thick end 41 of the peripheral seal 40 may have any desired thickness suitable for ensuring that a space formed between the exterior of the electrical box 10 and an interior surface 95 of the building structure 80 defining the opening 88 thereof. The thick end 41 may have a thickness of about ⅛ inch, as a non-limiting example. Other thicknesses for the thick end 41 may be used without departing from the scope of the present invention.

As shown in FIGS. 2 and 3, a spacing between the thin end 42 and the thick end 41 of the peripheral seal 40 is slightly smaller than a thickness of the layer of the drywall 82 forming the building construction 80. Alternatively, the spacing between the thin end 42 and the thick end 41 may be selected to be substantially equal to a combined thickness of the layer or layers of drywall 82 and the optional layer of the vapor seal 84. For example, the spacing between the thin end 42 and the thick end 41 may be equal to the thickness of a single layer of the drywall 82, a combined thickness of a single layer of the drywall 82 and one layer of the vapor seal 84, a combined thickness of two layers of drywall 82, or a combined thickness of two layers of drywall 82 and a single layer of the vapor seal 84, as non-limiting examples. In other embodiments, the spacing between the thin end 42 and the thick end 41 is selected to be greater than or less than the combined thickness of each of the layers forming the building structure 80.

The triangular cross-sectional shape of the peripheral seal 40 allows for improved entry of the electrical box 10 having the peripheral seal 40 into the opening 88 formed in the building construction 80. The thin end 42 of the peripheral seal 40 has substantially the same size and perimeter shape as that of an exterior surface of the plurality of the sidewalls 16 adjacent the front surface 18 of the electrical box 10 to allow the thin end 42 of the peripheral seal 40 to enter the opening 88 without substantial interference. Assuming the opening 88 is slightly larger than the exterior surface of the plurality of the sidewalls 16 adjacent the front surface 18 to ensure entry thereof, the entry of the peripheral seal 40 into the opening 88 will result in a tapered outer surface 43 of the peripheral seal 40 eventually contacting the inner surface 95 of the layer of drywall 82 defining the opening 88. As shown in FIG. 2, the peripheral seal 40 is not in a state of compression prior to the insertion of the electrical box 10 into the opening 88. As shown in FIG. 3, the entry of the peripheral seal 40 into the opening 88 eventually causes compression of the peripheral seal 40 intermediate the surface 95 and the sidewalls 16 of the electrical box 10. The continued compression of the peripheral seal 40 thereby causes a greater percentage of the outer surface 43 of the peripheral seal 40 to engage the inner surface 95 of the layer of drywall 82. As shown in FIG. 3, in some circumstances only a portion of the peripheral seal 40 is compressed following complete insertion of the electrical box 10 into the opening 88. The compressed portion of the peripheral seal 40 creates a seal around an entirety of the exterior surface of the plurality of the sidewalls 16 adjacent the front surface 18 of the electrical box 10 to prevent the flow of air from the inner surface 87 of the building structure 80 to the outer surface 86 thereof, and vice versa.

The peripheral seal 40 may be formed from any suitable material that is substantially fluid impermeable, capable of being compressed, and having suitable insulating properties. Favorable results have been obtained when the peripheral seal is resiliently compressible. The peripheral seal 40 may for example be formed from a compressible polymeric material. In one embodiment, the peripheral seal 40 is formed from a closed cell foam. The closed cell foam may be in the form of an adhesive backed strip adhered to the electrical box 10 about the exterior surface of the plurality of the sidewalls 16 adjacent the front surface 18 of the electrical box 10. The adhesive backed strip may include opposing ends that abut each other when the adhesive backed strip is disposed on the sidewalls 16 of the electrical box 10 to fully surround the opening 19 formed in the electrical box 10.

As shown in FIGS. 1-3, the thick end 41 of the peripheral seal 40 may be aligned with the plane defined by the rear surface 36 of each of the retention flanges 26, thereby causing the thick end 41 to be spaced axially from the peripheral edge 27 by the thickness dimension of each of the retention flanges 26. If the peripheral seal 40 is formed by the adhesive backed strip, the thick end 41 thereof may abut the rear surface 36 of each of the retention flanges 26 before the adhesive surface of the peripheral seal 40 contacts the exterior surface of each of the sidewalls 16 about the periphery thereof.

Alternatively, the peripheral seal 40 may be formed from a moldable material molded to the exterior surface of the plurality of the sidewalls 16 adjacent the front surface 18 of the electrical box 10. For example, a mold (not shown) having an interior chamber corresponding in shape and size to the triangular cross-sectional shape of the peripheral seal 40 may be disposed adjacent the sidewalls 16 of the electrical box 10 adjacent the front surface 18 thereof and the moldable material may be injected into the mold. The moldable material may then be cooled and cured to form the peripheral seal 40 on the exterior surface of the plurality of the sidewalls 16 adjacent the front surface 18 of the electrical box 10.

Figure 4:
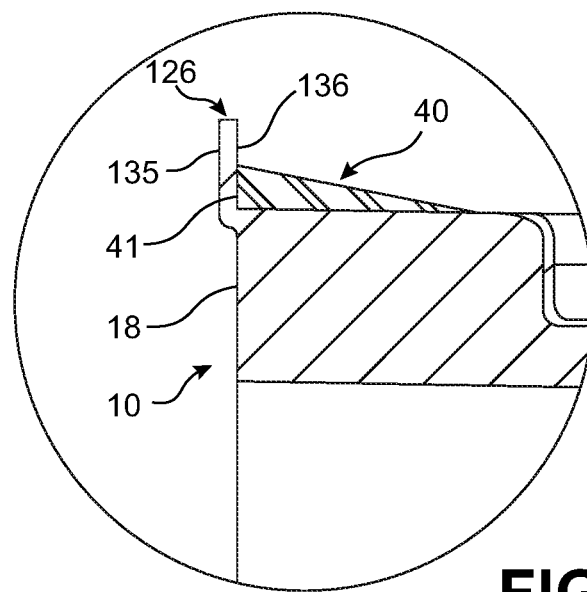
FIG. 4 is an enlarged fragmentary cross-sectional elevational view of an electrical box having a modified retention flange according to another embodiment of the invention.

FIG. 4 illustrates one alternative configuration of the electrical box 10 and the peripheral seal 40. In contrast to the embodiment shown in FIGS. 1-3, a retention flange 126 of the electrical box 10 includes a rear surface 136 formed co-planar with the remainder of the front surface 18 of the electrical box 10 and a front surface 135 spaced from the front surface 18 by the thickness dimension of the retention flange 126. This arrangement allows for the thick end 41 of the peripheral seal 40 to be arranged co-planar with the remainder of the front surface 18 of the electrical box 10. This arrangement eliminates the axial spacing between the thick end 41 of the peripheral seal 40 and the front surface 18 of the electrical box 10.

Figure 5:
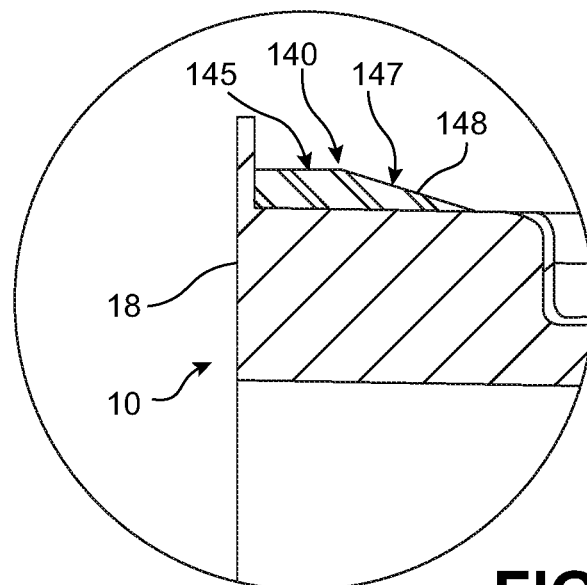
FIG. 5 is an enlarged fragmentary cross-sectional elevational view of an electrical box having a modified peripheral seal according to another embodiment of the invention.

FIG. 5 illustrates a peripheral seal 140 according to another embodiment of the invention. The peripheral seal 140 includes a rectangular cross-sectional portion 145 and a triangular cross-sectional portion 147. The rectangular cross-sectional portion 145 is configured to be disposed adjacent the front surface 18 of the electrical box 10 while the triangular cross-sectional portion 147 is spaced from the front surface 18 and configured to first enter the opening 88 of the building construction 80 when the electrical box 10 is installed therein. The triangular cross-sectional portion 147 includes a tapered surface 148 in similar fashion to the tapered surface 43 of the peripheral seal 40 to allow for ease of entry of the electrical box 10 into the opening 88. The inclusion of the rectangular cross-sectional portion 145 allows for the peripheral seal 140 to include a greater axial length thereof compressed to a maximum extent when the electrical box 10 is installed into the opening 88 of the building structure 80, thereby increasing a sealing effect of the peripheral seal 140.

Figure 6:
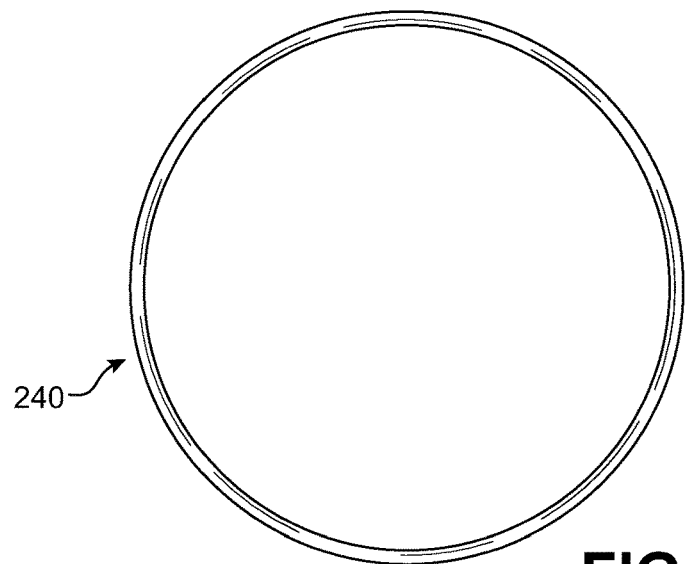
FIG. 6 is a top plan view of a peripheral seal having a circular perimeter shape configured for reception on an electrical box having an exterior surface with a circular perimeter shape.
Figure 7:
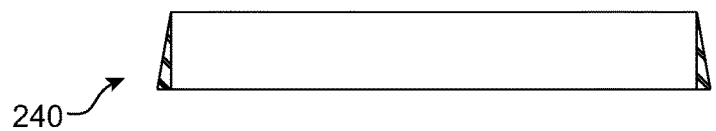
FIG. 7 is a cross-sectional elevational view of the peripheral seal of FIG. 6.
Figure 8:
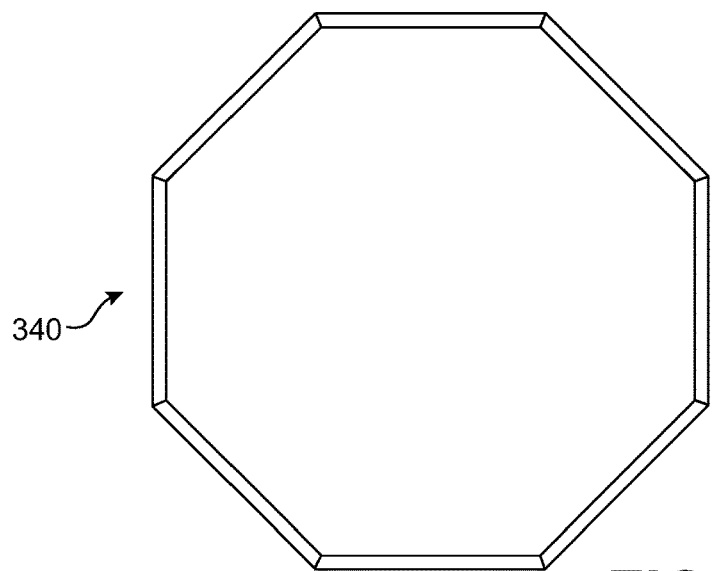
FIG. 8 is a top plan view of a peripheral seal having an octagonal perimeter shape configured for reception on an electrical box having an exterior surface with an octagonal perimeter shape.
Figure 9:
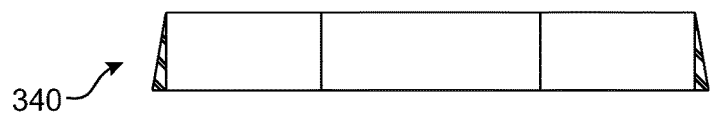
FIG. 9 is a cross-sectional elevational view of the peripheral seal of FIG. 8.

The peripheral seal 40 or the peripheral seal 140 may be adapted for use with electrical boxes having any suitable perimeter shape and size, as desired. For example, FIGS. 6 and 7 illustrate a peripheral seal 240 having a circular perimeter shape with a triangular cross-sectional shape similar to the cross-sectional shape of the peripheral seal 40. Alternatively, FIGS. 8 and 9 illustrate a peripheral seal 340 having an octagonal perimeter shape with a triangular cross-sectional shape similar to the triangular cross-sectional shape of the peripheral seal 40. It is understood that the peripheral seals 240, 340 may alternatively be formed to include both a triangular cross-sectional portion and a rectangular cross-sectional portion in similar fashion to the peripheral seal 140, as desired, without departing from the scope of the present invention.

An electrical box utilizing any one of the peripheral seals 40, 140, 240, 340 shown and described herein provides numerous benefits over an electrical box devoid of such a peripheral seal. First, the triangular cross-sectional shape of the peripheral seal facilitates an ease of entry of the electrical box into the corresponding opening of the building structure due to the initial entry of the pointed end thereof. Second, the eventual compression of the peripheral seal during the axial entry of the electrical box partially secures the axial position of the electrical box relative to the opening of the building structure to prevent undesired movement of the electrical box when attempting to secure the electrical box to the building structure. Lastly, the presence of the peripheral seal prevents the flow of air around the exterior surface of the electrical box, thereby improving the vapor barrier formed by the building structure having the electrical box installed therein.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An electrical box configured for reception within an opening formed in a building structure, the opening defined by an inner surface of the building structure, the electrical box comprising:
   a front surface having an opening formed therein providing access to a hollow interior of the electrical box;
   at least one sidewall extending rearwardly from the front surface to form the hollow interior; and
   a seal disposed on an exterior surface of the at least one sidewall, the seal formed from a resiliently compressible material, wherein the seal is compressed between the exterior surface of the at least one sidewall and the inner surface of the building structure when the electrical box is received within the opening of the building structure, wherein at least a portion of the seal is tapered inwardly to reduce in thickness as the seal extends rearwardly in a direction away from the front surface of the electrical box.

2. The electrical box of claim 1, wherein the seal is formed from a polymeric material.

3. The electrical box of claim 1, wherein the seal is formed from a closed cell foam.

4. The electrical box of claim 1, wherein the seal is adhered to the exterior surface of the at least one side wall.

5. The electrical box of claim 1, wherein the seal is molded to the exterior surface of the at least one side wall.

6. The electrical box of claim 1, wherein the at least one sidewall includes a first plurality of sidewalls cooperating to form a closed shape around the hollow interior of the electrical box, and wherein the seal extends around the closed shape formed by the first plurality of the sidewalls.

7. The electrical box of claim 6, wherein each of the first plurality of the sidewalls and the seal surrounds the hollow interior of the electrical box.

8. The electrical box of claim 7, wherein each of the first plurality of the sidewalls and the seal has a substantially rectangular perimeter shape.

9. The electrical box of claim 7, wherein each of the first plurality of the sidewalls and the seal has a substantially circular perimeter shape.

10. The electrical box of claim 7, wherein each of the first plurality of the sidewalls and the seal has a substantially octagonal perimeter shape.

11. The electrical box of claim 1, wherein a swing clamp is disposed on the at least one side wall, the swing clamp having a clamping arm configured to be drawn towards an end of a clamping screw as the clamping screw is rotated in a clockwise direction.

12. The electrical box of claim 11, wherein the clamping arm engages the inner surface of the building structure to secure the seal and maintain an axial positioning of the electrical box.

13. The electrical box of claim 11, wherein the clamping arm is pivotable to a position within a peripheral edge of a front surface of the electrical box to facilitate installation.

\* \* \* \* \*